United States Patent [19]
Felder et al.

[11] 3,886,203
[45] May 27, 1975

[54] 3-HYDROXYACYL AMINOMETHYL-5-ACYLAMINO-2,4,6-TRIIODOBENZOIC ACID SALTS AS X-RAY CONTRAST AGENTS

[75] Inventors: Ernst Felder; Davide Pitre, both of Milan, Italy

[73] Assignee: Bracco Industria Chimica, Societa per Axioni, Milan, Italy

[22] Filed: June 24, 1974

[21] Appl. No.: 482,666

[30] Foreign Application Priority Data
July 17, 1973  Switzerland...................... 10449/73

[52] U.S. Cl...... 260/501.11; 260/211 R; 260/471 C; 260/488 CD; 260/518 A; 260/519; 424/5
[51] Int. Cl.......................................... C07c 103/32
[58] Field of Search....................... 260/501.11, 519

[56] References Cited
UNITED STATES PATENTS
3,622,616  11/1971  Guerbet et al..................... 260/519

*Primary Examiner*—Robert Robert Gerstl
*Assistant Examiner*—L. Arnold Thaxton
*Attorney, Agent, or Firm*—Hans Berman; Kurt Kelman

[57] ABSTRACT

The water-soluble, physiologically tolerated sodium and alkanolamine salts of 3-hydroxyacylaminomethyl-5-acylamino-2,4,6-triiodobenzoic acids of the formula

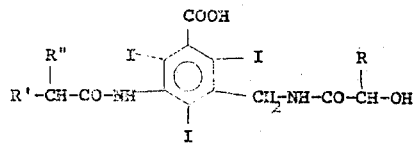

wherein R and R'' are hydrogen or methyl, R' is hydrogen or hydroxy, R' is hydroxyl when R is hydrogen, and R'' is hydrogen when R' is hydrogen, are X-ray contrast agents suitable for urography and vasography and well tolerated when their aqueous solutions are injected into a vein.

7 Claims, No Drawings

3-HYDROXYACYL AMINOMETHYL-5-ACYLAMINO-2,4,6-TRIIODOBENZOIC ACID SALTS AS X-RAY CONTRAST AGENTS

This invention relates to contrast agents for radiography, and particularly to radiopaque compounds whose sodium and alkanolamine salts are freely soluble in water and well tolerated when their aqueous solutions are administered intravenously prior to urography or vasography, to the preparation of the compounds, to the injectable compositions containing their salts, and to the use of the compositions in radiography.

It has been found that the aqueous solutions of sodium salts and alkanolamine salts of 3-hydroxyacylaminomethyl-5-acylamino-2,4,6-triiodobenzoic acids of the formula

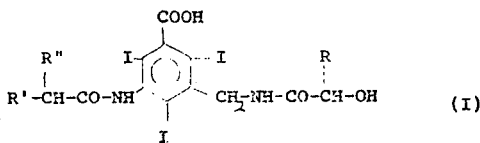

wherein R and R" are hydrogen or methyl, R' is hydrogen or hydroxyl, R' is hydroxyl when R is hydrogen, and R" is hydrogen when R' is hydrogen, are well tolerated when injected intravenously into a body in which a cavity is to be made opaque to X-rays, particularly for urography or vasography.

The five compounds encompassed by the above formula will be referred to hereinafter by capital letters as follows:

A: 3-α-Hydroxypropionylaminomethyl-5-hydroxyacetylamino-2,4,6-triiodobenzoic acid B: 3-α-Hydroxypropionylaminomethyl-5-acetylamino-2,4,6-triiodobenzoic acid C: 3-α-Hydroxypropionlyaminomethyl-5-α-hydroxypropionylamino-2,4,6-triiodobenzoic acid D: 3-Hydroxyacetylaminomethyl-5-hydroxyacetylamino-2,4,6-triiodobenzoic acid E: 3-Hydroxyacetylaminomethyl-5-α-hydroxypropionylamino-2,4,6-triiodobenzoic acid.

The water-soluble salts of these compounds are preferentially excreted with the urine by the kidneys, making them suitable for urography as well as vasography. They are superior in their low toxicity to the structurally most closely related known compounds as well as to the best contrast agents for urography and vasography in common clinical use heretofore.

Toxicity and excretion data of typical compounds of the invention are listed in Table I together with corresponding data for the following known compounds:

I: 3-Acetylaminomethyl-5-hydroxyacetylamino-2,4,6-triiodobenzoic acid (German patent application No. 2,124,904, published Dec 7, 1972)

K: 3-Acetylaminomethyl-5-acetylamino-2,4,6-triiodobenzoic acid (IODAMIDE; Swiss Pat. No. 414,063)

L: 3,5-Bis(-acetylamino)-2,4,6-triiodobenzoic acid (AMIDOTRIZOATE; Swiss Pat. Nos. 332,648 and 337,613)

M: 5-Acetylamino-2,4,6-triiodo-N-methylisophthalamide (IOTALAMIC ACID; Swiss Pat. No. 424,751).

The compounds listed in the Table were administered intravenously in the form of aqueous solutions of their N-methylgucamine salts. The methods employed are those in common laboratory use, and operating conditions strictly identical were maintained in corresponding tests so that the results are directly comparable. The median lethal dose $LD_{50}$ was determined in male white mice and is reported in mg iodine per kg body weight. The excretion data were derived from tests on anesthetized rabbits carrying catheters in their ureters. The secreted urine was analyzed for iodine content by means of an automatic analyzer, and the percentage of iodine excreted within 3 hours after injection of 100 mg iodine per kg body weight was calculated from the analytical data.

TABLE I

| COMPOUND | Toxicity $LD_{50}$, mg I/kg | Excretion %, after 3 hrs |
|---|---|---|
| A | 9000 | 71 |
| B | 9600 | 62 |
| D | 8200 | 79 |
| E (Na-salt) | 8900 | 80 |
| I | 6150 | 75 |
| K | 7050 | 83 |
| L | 6800 | 71 |
| M | 6300 | 80 |

The water-soluble, physiologically tolerated sodium and alkanolamine salts of the compounds of the invention are administered intravenously by injection or infusion for urography and vasography. The mono-, di-, and polyhydroxy-alkylamines commonly employed in pharmacy as catinic moieties in injectable salts with physiologically active acids are generally suitable for the purpose of this invention. They include, but are not limited to, N-methyl-D-glucamine, N-methylxyalmine(1-methylamino-1-desoxy-D-xylite), 1-methylamino-2,3-propanediol, diethanolamine, monoethanolamine, and tris-(hydroxymethyl)-aminomethane. Mixtures of sodium and alkanolamine salts are preferred in preparing aqueous compositions of high iodine content for optimum tolerance and low viscosity of the injected solutions. The choice of the cationic moiety or moieties may also be influenced by the specific application, as is known in itself. For intravenous injection, solutions containing 150 mg to 450 mg iodine per milliliter are generally preferred, but the salts lend themselves readily to the preparation of aqueous compositions containing more than 500 ml iodine per milliliter, as may sometimes be necessary. For intravenous infusion, more dilute solutions containing 45 to 150 mg iodine per milliliter are normally employed.

In preparing the compounds of formula (I), 3-aminomethyl-5-amino-2,4,6-triiodobenzoic acid is reacted with one of two acylating agents which are acids of the respective formulas

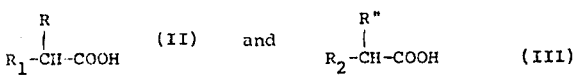

wherein $R_1$ is a masking radical selected from the group consisting of acyloxy, a readily removable portion of an ether group, and readily saponifiable halogen, $R_2$ is hydrogen or a masking radical of said group, R and R'' are hydrogen or methyl, the acids being combined with a dehydrating agent, or which are anhydrides or acyl halides of the respective acids of formulas (II) and (III) until an intermediate is formed in which one of the amino groups of the 3-aminomethyl-5-amino-2,4,6-triiodobenzoic acid is acylated. The intermediate then is reacted with the other one of the acylating agents, and the compound of formula (I) is recovered from the reaction mixture while all masking radicals present are removed by hydrolysis or hydrogenolysis, preferably by hydrolysis in an alkaline aqueous medium at moderately elevated temperature.

The preferred acylating agents are the halides, particularly the chlorides, and the anhydrides of the carboxylic acids of formulas (II) and (III).

When $R_1$ and $R_2$ are identical, the two acylation reactions outlined above are conveniently combined in a single step without isolating the intermediate. The 3-aminomethyl group of the starting material is more reactive than the aromatic 5-amino group and is normally acylated first.

For introducing hydroxyacylamino groups in the starting material, it is essential that hydroxy groups in the acylating agents of formulas (II) and (III), and in the corresponding acyl halides or anhdrides, be masked as by esterification with a carboxylic acid or hydrogen halide, or by ether formation with a group that is readily split off. Preferred ester forming radicals are the acyloxy groups of lower alkanoic acids, such as the acetyloxy group. However, the acyloxy groups of araliphatic or aromatic acids are equally effective.

The acyloxy group masking a hydroxyl group in a compound of formula (I) is readily removed during recovery of the desired compound by alkaline hydrolysis without requiring a separate operation. During acylation of tri-iodated aromatic amines, particularly during acylation by means of carboxylic acid anhydrides, both hydrogen atoms of the aromatic nitrogen in position 5 are often acylated. The N-diacyl derivatives are not very stable, and one acyl group is readily split off during alkaline hydrolysis under mild conditions. These conditions also cause simultaneous hydrolysis of acyloxy groups which may be present in the molecule. The hydrolyzation reactions are readily performed at a pH of 9 to 12 at temperatures between 20° and 60°C, sodium hydroxide being a convenient hydrolyzing agent, and are represented by the following equations:

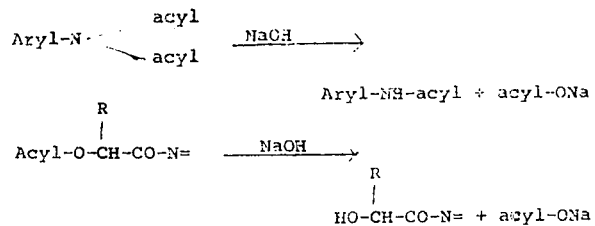

wherein acyl may be acetyl, for example.

For masking, the hydrogen atom in the hydroxyl group to be masked may also be replaced by a benzyl, diphenylmethyl, triphenylmethyl (trityl), trimethylsilyl or similar group forming an ether which is readily split without simultaneously affecting the amide bond. Ultimately, the hydroxyl group may also be replaced for masking purposes by halogen, more specifically chlorine, bromine, or iodine, which is removed during recovery of the end product by alkaline saponification in a manner obvious from the above equations.

The sequence in which the two available amino groups of 3-aminomethyl-5-amino-2,4,6-triiodobenzoic acid are acylated may be modified by first preparing a 3-amino-methyl-5-acylamino-2,4,6-triiodobenzoic acid in which subsequently the 3-aminomethyl group is acylated by reaction with a carboxylic acid of formula (II) or its acyl halide or anhydride. This procedure generally is not preferred because it requires initial masking of the 3-aminomethyl group by a selectively removable group such as urethanyl group or ureido group, as will be shown in more detail hereinbelow in Example 5, the starting material being thus of the formula

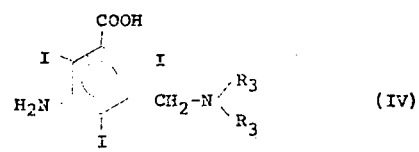 (IV)

wherein $R_3$ is hydrogen, COO Alkyl, COO Aralkyl, or $CONH_2$.

The following Examples are further illustrative of this invention. The $R_f$ values reported in the Examples were determined by thin layer chromatography (TLC) on silica gel using a solvent system of methylethylketone/glacial acetic acid/50% ethanol 20:3:6 unless stated otherwise.

EXAMPLE 1

3-α-Hydroxypropionylaminomethyl-5-hydroxyacetylamino-2,4,6-triiodobenzoic acid
(Compound A)

55.4 g (0.1 Mole) 3-aminomethyl-5-amino-2,4,6-triiodobenzoic acid(Helv. Chim. Acta 48 [1965] 259) was dissolved in 200 ml water and 100 ml 1-N sodium hydroxide solution. The solution was cooled with ice while a solution of 15 g 2-acetoxypropionyl chloride (0.1 mole) in 30 ml acetone and 100 ml 1-N sodium hydroxide solution were added simultaneously drop by drop. After the reaction was completed, the pH of the mixture dropped to 5, and 11.5 g unreacted 3-aminomethyl-5-amino-2,4,6-triiodobenzoic acid was precipitated gradually. It was recovered by filtering after 16 hours, and the filtrate was made strongly acid by addition of hydrochloric acid to precipitate 46 g 3-α-acetoxypropionyl-aminomethyl-5-amino-2,4,6-triiodobenzoic acid which melted with decomposition at 203° to 204°C, and gave an $R_f$ value of 0.89. The yield was 89% based on the actually reacted triiodobenzoic acid derivative. The intermediate was identified by elementary analysis.

| Calculated for $C_{13}H_{13}I_3N_2O_5$: | 23.73%, C; | 57.86%, I. |
|---|---|---|
| Found: | 23.62%, C; | 57.93%, I. |

13.2 g (0.02 Mole) 3-α-acetoxy-propionyl-aminomethyl-5-amino-2,4,6-benzoic acid was dissolved in 30 ml dimethylformamide, and 5.4 g acetoxyacetylchloride was added to the solution drop by drop with ice cooling. The mixture was stirred 4 hours at room temperature and then evaporated to dryness in a vacuum. The residue was stirred with 200 ml water, and filtered off. It was dissolved in dilute sodium hydroxide solution, and the solution so obtained was heated to 50°C and kept at pH 10 by additions of 1-N NaOH. When the pH stabilized, the solution was acidified with dilute hydrochloric acid and evaporated to dryness in a vacuum. The residue was taken up in 150 ml ethanol permitting the removal of undissolved sodium chloride and some sodium acetate by filtration. The alcoholic filtrate was evaporated to dryness, and the residue was taken up in 30 ml boiling water, 9.7 g 3-α-Hydroxypropionylaminomethyl-5-hydroxyacetylamino-2,4,6-triiodobenzoic acid crystallized upon cooling. It had a melting point of 166°–168°C, and gave an $R_f$ value of 0.48.

It was identified by elementary analysis and equivalent weight:

| | | |
|---|---|---|
| Calc'd for $C_{13}H_{13}I_3N_2O_6 \cdot H_2O$: | 22.56% C; 55.02% I; | eq. wt. 692 |
| Found: $H_2O$: 2.6%; | 22.55% c; 54.83% I; | eq. wt. 688 |

The pure acid is only sparingly soluble in water, even at moderately elevated temperature, and in chloroform. It dissolves readily in methanol and less readily in ethanol. The sodium and N-methylglucamine salts dissolve in an equal weight of water or less at 20°C.

EXAMPLE 2

3-α-Hydroxypropionylaminomethyl-5-acetylamino-2,4,6-triiodobenzoic acid (Compound B)

46.1 g (0.07 Mole) 3-α-acetoxypropionyl-aminomethyl-5-amino-2,4,6-triiodobenzoic acid prepared as in Example 1 was acetylated by heating for 3 hours on a steam bath with 20 ml acetic anhydride in 100 ml acetic acid in the presence of 0.1 ml sulfuric acid. Upon cooling of the reaction mixture, 3-α-acetoxypropionyl-aminomethyl-5-acetylamino-2,4,6-triiodobenzoic acid crystallized and was recovered in an amount of 35.3 g (71% yield). It melted at 245° (decomp.) and gave an $R_f$ value of 0.075.

| | | |
|---|---|---|
| Calculated for $C_{15}H_{15}I_3N_2O_6$: | 25.74% C; | 54.39% I. |
| Found: | 25.57% C; | 54.50% I. |

35.3 g 3-α-Acetoxypropionyl-aminomethyl-5-acetylamino-2,4,6-triiodobenzoic acid was dissolved in a mixture of 50 ml 1-N sodium hydroxide solution and 100 ml water, and the solution was kept at 50°C until the α-acetoxy groups were completely saponified, a pH of 10 being maintained by futher additions of 1-N sodium hydroxide as needed. After the saponification mixture was adjusted to pH 5 with hydrochloric acid, it was treated with active carbon and filtered to remove turbidity, and the filtrate was acidified with 18% hydrochloric acid. The precipitated crude 3-α-hydroxypropionylaminomethyl-5-acetylamino-2,4,6-triiodobenzoic acid was recovered in an amount of 31 g (94% yield) by filtration with suction and had a melting point of 180° to 185°C.

It was dissolved in 50 ml boiling methanol, whereby its crystal form was changed and pure 3-α-hydroxypropionylaminomethyl-5-acetylamino-2,4,6-triiodobenzoic acid was precipitated gradually. It weighed 28.5 g, melted at 262°–265°C (decomp.), and gave an $R_f$ value of 0.60.

| | | | |
|---|---|---|---|
| Calc'd for $C_{13}H_{13}I_3N_2O_5$: | 23.73% C; | 57.86% I; | eq.wt. 658. |
| Found: | 23.62 | 57.63% I; | eq.wt. 668. |

The free acid is only sparingly soluble in water, methanol, ethanol, or chloroform at the respective boiling temperatures. The sodium and N-methylglucamine salts dissolve at 20°C in an equal weight of water or less.

EXAMPLE 3

3-α-Hydroxypropionylaminomethyl-5-α-hydroxypropionylamino-2,4,6-triiodobenzoic acid (Compound C)

10.8 g 3-Aminomethyl-5-amino-2,4,6-triiodobenzoic acid (0.02 mole) was suspended in 30 ml dimethylformamide, and 15 g 2-acetoxypropionyl chloride (0.1 mole) was added drop by drop while the mixture was being stirred and cooled with ice. After 15 hours, the solution so obtained was evaporated to dryness in a vacuum. The residue was extracted with 150 ml water, and the extract was removed by filtering with suction. The solid residue was dissolved in 50 ml water by gradual addition of sodium bicarbonate, the solution was filtered, and the filtrate was acidified with hydrochloric acid.

The precipitate formed was dissolved in water by addition of 2-N sodium hydroxide solution, and the solution was kept at 60°C while a pH of 10 was maintained by dropwise additions of 2-N sodium hydroxide until the acetoxy groups had been split off. After cooling, the saponification mixture was mixed with enough hydrochloric acid to make it strongly acidic, whereby a precipitate was formed. The liquid was evaporated to dryness in a vacuum without removing the precipitate, and the residue was dried carefully. It was then extracted with absolute ethanol, permitting the removal of undissolved sodium chloride and sodium acetate by filtration. The liquid extract was evaporated in a vacuum. The residue melted at 120°–130°C.

It was taken up in 20 ml boiling ethyl acetate from which pure 3-α-hydroxypropionylaminomethyl-5-α-hydroxypropionylamino-2,4,6-triiodobenzoic acid crystallized upon cooling. It melted at 245°C (decomp.), and gave an $R_f$ value of 0.58 with methylethylketone/glacial acetic acid/50% ethanol 50:3:6.

| | | | |
|---|---|---|---|
| Calc'd for $C_{14}H_{15}I_3N_2O_6$: | 24.44% C; | 55.34% I; | eq.wt. 688. |
| Found: | 24.35 | 55.43% I; | eq.wt. 684. |

Saturated solutions of the free acid in water at 20°C contain 1%, those in boiling water 4%, and a solution in ethanol at 20°C 20% of the compound.

EXAMPLE 4

3-Hydroxyacetylaminomethyl-5-hydroxyacetylamino-2,4,6-triiodobenzoic acid (Compound D)

A suspension of 21.72 g (0.04 mole) 3-aminomethyl-5-amino-2,4,6-triiodobenzoic acid in 80 ml dimethylacetamide was mixed over a period of 25 minutes with 27.2 g acetoxyacetyl chloride (0.2 mole) with stirring at 0°C. The temperature was permitted gradually to rise to room temperature, and stirring was continued for 13 hours. The solution then was poured into 400 ml water, and the precipitate formed thereby was filtered off with suction, washed with water, and taken up in dilute sodium hydroxide. The solution was adjusted to pH 6 and filtered to remove turbidity. The filtrate was adjusted to pH 9.5 with sodium hydroxide and heated to 55°C. A pH of 9.5 was maintained by gradual addition of 80 ml 1-N sodium hydroxide. When the pH became stable (about 1–2 hours), the solution was cooled to ambient temperature and acidified with hydrochloric acid.

The precipitated Compound C weighing 22.2 g (84.2% yield) was further purified by dissolution in dilute sodium hydroxide and precipitation with hydrochloric acid. It had a melting point of 188°–189°C and gave an $R_f$ value of 0.4 with a solvent system of butanol/glacial acetic acid/water 3:1:2. It absorbs two moles of crystal water from a moist ambient atmosphere.

| | | | |
|---|---|---|---|
| Calc'd for $C_{12}H_{11}I_3N_2O_6$: | 21.84%, C; | 57.68%, I; | eq.wt. 659.94. |
| Found: | 21.98%, C; | 57.69%, I; | eq.wt. 655, 665. |

At 20°C, water dissolves 2%, methanol and ethanol 50% of the free acid. Water at 96°C dissolves 20%. The sodium salt dissolves in less than its own weight of water at 20°C.

EXAMPLE 5

3-α-Hydroxypropionylaminomethyl-5-acetylamino-2,4,6-triiodobenzoic acid

Compound B was also prepared by an alternative method.

54.3 g Aminomethyl-5-amino-2,4,6-triiodobenzoic acid (0.1 mole) was suspended in 500 ml water and dissolved by the addition of 100 ml 1.0-N sodium hydroxide. While the solution was stirred at 5°–10°C, 40 ml of a 50% toluene solution of benzyl chloroformate (0.11 mole) and 100 ml 1-N sodium hydroxide solution were added simultaneously drop by drop in such a manner as to maintain a pH of 10 to 11 in the mixture. The solution so obtained was adjusted to pH 7 and extracted with ethyl ether. When the aqueous phase was acidified, 55.4 g 3-benzyloxycarbonylaminomethyl-5-amino-2,4,6-triiodobenzoic acid (82% yield, Intermediate 1) was precipitated. The precipitate crystallized spontaneously upon contact with hot acetic acid, had a melting point of 205° to 208°C, and was identified by analysis:

| | | |
|---|---|---|
| Calculated for $C_{16}H_{13}I_3N_2O_4$: | 28.34%, C; | 56.15%, I. |
| Found: | 28.53%, C; | 55.96. |

67.8 g Intermediate 1 (0.1 mole), prepared as described above, was mixed with 120 ml glacial acetic acid, 20 ml acetic anhydride, and 0.1 ml concentrated sulfuric acid, and the mixture was stirred on a steam bath for 3 hours. All ingredients initially present dissolved, and 3-benzyloxycarbonylaminomethyl-5-acetylamino-2,4,6-triiodobenzoic acid (Intermediate 2) then precipitated in an amount of 60 g (84% yield). The recovered Intermediate 2 melted at 210° to 215°C.

| | | |
|---|---|---|
| Calculated for $C_{18}H_{15}I_3N_2O_5$: | 30.02%, C; | 52.87%, I. |
| Found: | 29.99%, C; | 52.91%, I. |

19.3 g Intermediate 2 was added in small batches to 55 ml of a 40% solution of hydrogen bromide in glacial acetic acid. While carbon dioxide developed, the mixture was stirred 1 hour at room temperature and one hour more at 40°C. It was then poured into 250 ml ethyl ether. The precipitate formed was filtered off with suction, washed with ethyl ether, dried, and dissolved in water. The aqueous solution was adjusted with sodium hydroxide to pH 5 and stored overnight. 3-Aminomethyl-5-acetylamino-2,4,6-triiodobenzoic acid (Intermediate 3) crystallized with 2.5 moles crystal water in an amount of 13.9 g (88% yield) and melted at 258°–259°C.

| | | | |
|---|---|---|---|
| Calc'd for $C_{10}H_9I_3N_2O_3 \cdot 2.5H_2O$: | 19.03%, C; | 60.35%, I; | 7.14%, $H_2O$ |
| Found: | 18.95%, C; | 60.57%, I; | 7.01%, $H_2O$ |

8.8 g (0.015 Mole) Intermediate 3 was suspended in 30 ml dimethylformamide, and 10 ml solvent was distilled off in a vacuum to remove all moisture. 4.5 g (0.03 Mole) α-acetoxypropionyl chloride in 10 ml dimethylformamide was added dropwise with stirring, stirring was continued 20 hours at room temperature, and the reaction mixture was then evaporated to dryness in a vacuum. The residue was triturated with water, filtered out with suction, and dissolved in 100 ml water and 2-N sodium hydroxide solution. The solution so formed was kept at 50°C and at a pH of 10 by continuous small additions of 1-N sodium hydroxide solution until the acetoxy groups were completely saponified.

Compound B then was precipitated with hydrochloric acid and purified as described in Example 2. It was recovered in an amount of 8 g (81% yield) and had an equivalent weight of 667 (calculated: 658).

EXAMPLE 6

3-Hydroxyacetylaminomethyl-5-hydroxyacetylamino-2,4,6-triiodobenzoic acid (Compound D)

When 0.1 mole 3-aminomethyl-5-amino-2,4,6-triiodobenzoic acid was reacted with 0.3 mole chloroacetyl chloride in dimethylacetamide at 0°–10°C, 3-chloroacetylaminomethyl-5-chloroacetylamino-2,4,6-triiodobenzoic acid was obtained. This compound when stored in water containing at least 3 moles sodium hydroxide per mole of the benzoic acid derivative at 20°–50°C was saponified to Compound D which could be recovered by acidifying the alkaline solution with hydrochloric acid, and was further purified as described in Example 4.

The ultimate product weighed 55 g (approximately 83% yield).

EXAMPLE 7

3-Hydroxyacetylaminomethyl-5-α-hydroxypropionylamino-2,4,6-triiodobenzoic acid (Compound E)

108 g (0.2 Mole) 3-aminomethyl-5-amino-2,4,6-triiodobenzoic acid was suspended in 400 ml water, and a clear solution was formed when 200 ml 1.0-N sodium hydroxide solution was added. Over a period of 1 hour, a solution of 27.3 g (0.2 mole) acetoxyacetyl chloride in 60 ml acetone and aproximately 210 ml 1-N sodium hydroxide solution were added dropwise simultaneously with stirring and ice cooling at such a rate that a pH of 10 to 10.5 was maintained. After all ingredients were combined, the mixture was further stirred 2 hours at 10° to 15°C and a pH of 10 to 10.5.

Thereafter, the pH of the mixture was adjusted to 5, and stirring was continued for 2 hours. A small amount of starting material precipitated and was filtered off.

The filtrate was strongly acidified, and the precipitate formed thereby was filtered off with suction 15 hours later. It consisted of 120 g 3-acetoxyacetylaminomethyl-5-amino-2,4,6-triiodobenzoic acid (93.4% yield) which sintered at 210°C and decomposed at 224°C. It gave an $R_f$ value of 0.84.

| | | | |
|---|---|---|---|
| Calc'd for $C_{12}H_{11}I_3N_2O_5$: | 22.38%, C; | 59.11%, I; | eq.wt. 643.94. |
| Found: | 22.37%, C; | 59.08%, I; | eq.wt. 645.8. |

109.5 g 3-Acetoxyacetylaminomethyl-5-amino-2,4,6-triiodobenzoic acid was dissolved in 255 ml dimethylformamide, and the solution was stirred at 10° to 15°C while 51 g α-acetoxypropionyl chloride was added dropwise. After a few hours stirring at room temperature, the reaction solution was evaporated to dryness in a vacuum, the residue was dissolved in a little actone, and the acetone solution was stirred into one liter water.

A gummy precipitate formed and was dissolved in 60 ml 15% sodium hydroxide solution. The solution was kept at 50°C, and a pH of 10 was maintained by further additions of 15% sodium hydroxide until the acetoxy groups were completely saponified. The solution then was acidified with 18% hydrochloric acid which did not produce a precipitate. The acidic solution was evaporated to dryness in a vacuum, and the residue was dissolved in approximately one liter absolute ethanol except for sodium chloride which was removed by filtering. The filtrate was again evaporated to dryness, and the semisolid residue was suspended in 200 ml ethanol. 35 g N,N-Dimethyl-cyclohexylamine was added, and the mixture was stirred three hours at room temperature, thereafter 5 hours longer at about 0°C.

The precipitated cyclohexylamine salt weighing 74 g was filtered off with suction. 70 g (0.086 Mole) of the salt was suspended in water, and brought into solution by adding about 90 ml 1-N sodium hydroxide. The solution so obtained was evaporated to dryness in a vacuum. The residue was dissolved in water, the solution was made strongly acidic with hydrochloric acid and again evaporated to dryness. The residue was taken up in hot, anhydrous ethanol. The undissolved sodium chloride was filtered off, and the filtrate was evaporated to dryness. The residue was suspended in water from which Compound E precipitated in crystals weighing 35 g and melting at 240° to 242°C. It gave an $R_f$ value of 0.495.

| | | | |
|---|---|---|---|
| Calc'd for $C_{13}H_{13}I_3N_2O_6$: | 23.16%, C; | 56.48%, I; | eq.wt. 674. |
| Found: | 23.35%, C; | 56.28%, I; | eq.wt. 682. |

The sodium and N-methylglucamine salts dissolve very readily in water.

EXAMPLE 8

X-Ray contrast compositions for use in urography or vasography were prepared according to the formulations in Table II.

TABLE II

| | | | | |
|---|---|---|---|---|
| Compound D, g | 520 | — | — | — |
| Compound B (Ex. 2), g | — | 778 | — | — |
| Compound C, g | — | — | 772.5 | — |
| Compound A, g | — | — | — | 818 |
| N-Methylglucamine, g | 114.9 | 133.2 | — | 97.61 |
| N-Methyl-xylamine, g | — | — | 54.5 | — |
| Monoethanolamine, g | — | 24.42 | — | 30.54 |
| 1-Methylamino-2,3-propanediol, g | — | — | 34.7 | — |
| Sodium hydroxide, g | 8.0 | — | 13.2 | 7.32 |
| Tris-(hydroxymethyl)-aminomethane, g | — | 12.11 | 7.26 | — |
| Disodium EDTA, g | 0.1 | 0.1 | 0.1 | 0.1 |
| Water to make ml | 1000 | 1200 | 1000 | 1000 |
| Iodine content, mg/ml | 300 | 375 | 400 | 450 |

The disodium ethylenediamine tetraacetic acid was first dissolved in a small amount of bidistilled water, and the other solid ingredients were then added with stirring. The solution so obtained was adjusted to pH 7.1 ± 0.2, filtered, and diluted with bidistilled water to the volume indicated. The diluted solution was distributed in glass vials of 10 and 20 ml capacity which were sealed in a nitrogen atmosphere and heated to 110°–120°C for about 20 minutes for sterilization of the contents.

What is claimed is:

1. A compound which is a 3-hydroxyacylaminomethyl-5-acylamino-2,4,6-triiodobenzoic acid of the formula

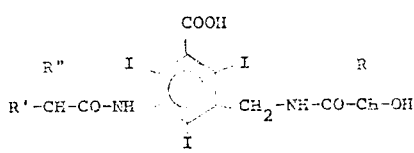

(I)

wherein
R and R'' are hydrogen or methyl,
R' is hydrogen or hydroxyl,
R' is hydroxyl when R is hydrogen, and
R'' is hydrogen when R' is hydrogen; or
a water-soluble, physiologically tolerated sodium or alkanolamine salt of said acid.

2. A compound as set forth in claim 1, wherein R is hydrogen.

3. A compound as set forth in claim 2, wherein R'' is hydrogen.

4. A compound as set forth in claim 2, wherein R'' is methyl.

5. A compound as set forth in claim 1, wherein R is methyl, and R' is hydrogen.

6. A compound as set forth in claim 1, wherein R is methyl, R' is hydroxyl, and R'' is hydrogen.

7. A compound as set forth in claim 1, wherein R and R'' are methyl.

* * * * *